US009157399B2

(12) United States Patent
Walters et al.

(10) Patent No.: US 9,157,399 B2
(45) Date of Patent: Oct. 13, 2015

(54) FUEL FILTER ADAPTER

(75) Inventors: Jeremy J. Walters, San Diego, CA (US); David L. Ripley, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 826 days.

(21) Appl. No.: 13/101,258

(22) Filed: May 5, 2011

(65) Prior Publication Data

US 2012/0279478 A1 Nov. 8, 2012

(51) Int. Cl.
*B01D 35/30* (2006.01)
*F02M 37/22* (2006.01)
*B01D 36/00* (2006.01)
*B01D 35/28* (2006.01)

(52) U.S. Cl.
CPC .............. *F02M 37/223* (2013.01); *B01D 35/28* (2013.01); *B01D 35/30* (2013.01); *B01D 35/306* (2013.01); *B01D 36/00* (2013.01); *B01D 36/003* (2013.01); *B01D 36/008* (2013.01); *Y10T 29/49716* (2015.01)

(58) Field of Classification Search
CPC ...... B01D 35/28; B01D 35/30; B01D 35/306; B01D 36/00; B01D 36/003; B01D 36/008
USPC .......................................................... 123/495
See application file for complete search history.

(56) References Cited

U.S. PATENT DOCUMENTS 2,761,387 A * 9/1956 Gaubatz .......................... 417/62
3,695,097 A * 10/1972 Michalowicz ............. 73/114.42
3,743,011 A * 7/1973 Frost ............................ 165/283
3,830,289 A * 8/1974 Olson ............................ 165/51
4,231,342 A * 11/1980 Johnston ...................... 123/557
4,452,695 A * 6/1984 Schmidt .................. 210/167.05
4,492,632 A * 1/1985 Mattson .................. 210/167.05
4,524,733 A * 6/1985 Schmidt .................... 123/196 A
4,683,864 A * 8/1987 Bucci ........................... 123/575
4,696,156 A * 9/1987 Burr et al. .................... 60/39.08
4,831,980 A * 5/1989 Nasu et al. ................ 123/196 A
4,913,380 A * 4/1990 Vardaman et al. ........ 244/135 R
4,974,570 A 12/1990 Szwargulski et al.
5,017,285 A * 5/1991 Janik et al. .................... 210/232
5,244,571 A * 9/1993 Church et al. ................ 210/232
5,298,158 A * 3/1994 Anderson ................ 210/167.04
5,336,045 A 8/1994 Koyama et al.
5,392,750 A 2/1995 Laue et al.
5,406,910 A * 4/1995 Wallin ......................... 123/41.33
5,476,139 A * 12/1995 Gire ............................. 165/119
5,653,206 A * 8/1997 Spurgin .................. 123/196 AB
5,853,575 A * 12/1998 Wydra et al. .................. 210/136
5,878,718 A * 3/1999 Rembold et al. .............. 123/456
5,887,561 A * 3/1999 Spurgin .................. 123/196 AB
6,206,090 B1 3/2001 Rago
6,237,322 B1 5/2001 Rago
6,261,448 B1 * 7/2001 Merchant et al. ............. 210/184
6,367,454 B1 * 4/2002 Rembold et al. .............. 123/497
6,675,881 B1 1/2004 Rago
6,746,600 B2 * 6/2004 Nguyen ................... 210/167.06
6,811,686 B1 * 11/2004 Sorce ....................... 210/167.06

(Continued)

*Primary Examiner* — Hieu T Vo
*Assistant Examiner* — Sherman Manley
(74) *Attorney, Agent, or Firm* — Carlson, Gaskey & Olds, P.C.

(57) ABSTRACT

An adapter for retrofitting a fuel control system. The adapter has an outlet port and an inlet port for connecting to an external fuel system. The adapter replaces a standard fuel filter and fuel filter bowl.

25 Claims, 4 Drawing Sheets

332 334 300 320 336 340 348 342 346 346 344 322 322 338 338 350 360 310

(56) References Cited

U.S. PATENT DOCUMENTS

| | | | | |
|---|---|---|---|---|
| 6,994,784 | B2 * | 2/2006 | Jainek | 210/149 |
| 6,996,970 | B2 | 2/2006 | Lorenz | |
| 7,108,139 | B2 | 9/2006 | Nguyen | |
| 7,179,390 | B1 * | 2/2007 | Layton | 210/767 |
| 7,294,262 | B2 * | 11/2007 | Tadlock | 210/232 |
| 7,329,337 | B2 * | 2/2008 | Millar | 210/85 |
| 7,540,141 | B2 | 6/2009 | Goldberg et al. | |
| 2004/0182566 | A1 * | 9/2004 | Jainek | 165/300 |
| 2005/0023200 | A1 * | 2/2005 | Ueshima et al. | 210/168 |
| 2006/0124532 | A1 * | 6/2006 | Magnusson et al. | 210/420 |
| 2006/0254971 | A1 * | 11/2006 | Tubby et al. | 210/235 |
| 2008/0035544 | A1 * | 2/2008 | Rennie | 210/167.04 |
| 2008/0093275 | A1 * | 4/2008 | Brown | 210/86 |

* cited by examiner

FUEL FILTER ADAPTER

BACKGROUND

The present application is directed to fuel control systems and more particularly to a fuel filter adapter.

Fuel control systems for vehicles, such as aircraft, often include a two stage pump in order to provide pressurized, filtered fuel to a combustor. The first pump stage pressurizes the fuel prior to a fuel filter, and ensures adequate pressure for the fuel to pass through the filter. The second stage re-pressurizes the filtered fuel for use in the combustor. In certain applications, regulatory agencies require that fuel control systems include a fuel oil heat exchanger within the fuel control system in order to prevent fuel icing conditions that block fuel flow through the fuel filter.

It is known in the art to retrofit existing fuel control systems by interrupting the fuel path and placing a fuel oil heat exchanger upstream of the first pump stage. Introduction of a fuel oil heat exchanger prior to the first pump stage, however, also introduces a pressure drop that can render the two stage pump incapable of providing adequate fuel pressure.

SUMMARY

Disclosed is a fuel control system having a first pump stage, a second pump stage downstream of the first pump stage, a fuel filter housing connecting an output of the first pump stage to an input of the second pump stage, and an adapter housed in the fuel filter housing. The fuel filter housing is configured to house a fuel filter bowl and a fuel filter. The adapter has an outlet port for connecting the output of the first pump stage to an input of an external fuel system and an inlet port for connecting the external fuel system to an input of the second pump stage.

Also disclosed is an adapter for a fuel control system having an adapter body with a non-permeable barrier for isolating a high pressure zone from a low pressure zone and a retaining portion. An inlet port is retained in said retaining portion and is capable of being fluidly connected to the low pressure zone. An outlet port is retained in said retaining portion and is capable of being fluidly connected to the high pressure zone.

Also disclosed is a method for retrofitting a fuel control system including the step of installing an adapter in a fuel filter housing, thereby providing an outlet port from the fuel control system for connecting to an external fuel system and an inlet port for connecting the external fuel system to the fuel control system.

These and other features of the present invention can be best understood from the following specification and drawings, the following of which is a brief description.

DETAILED DESCRIPTION

Figure 1:
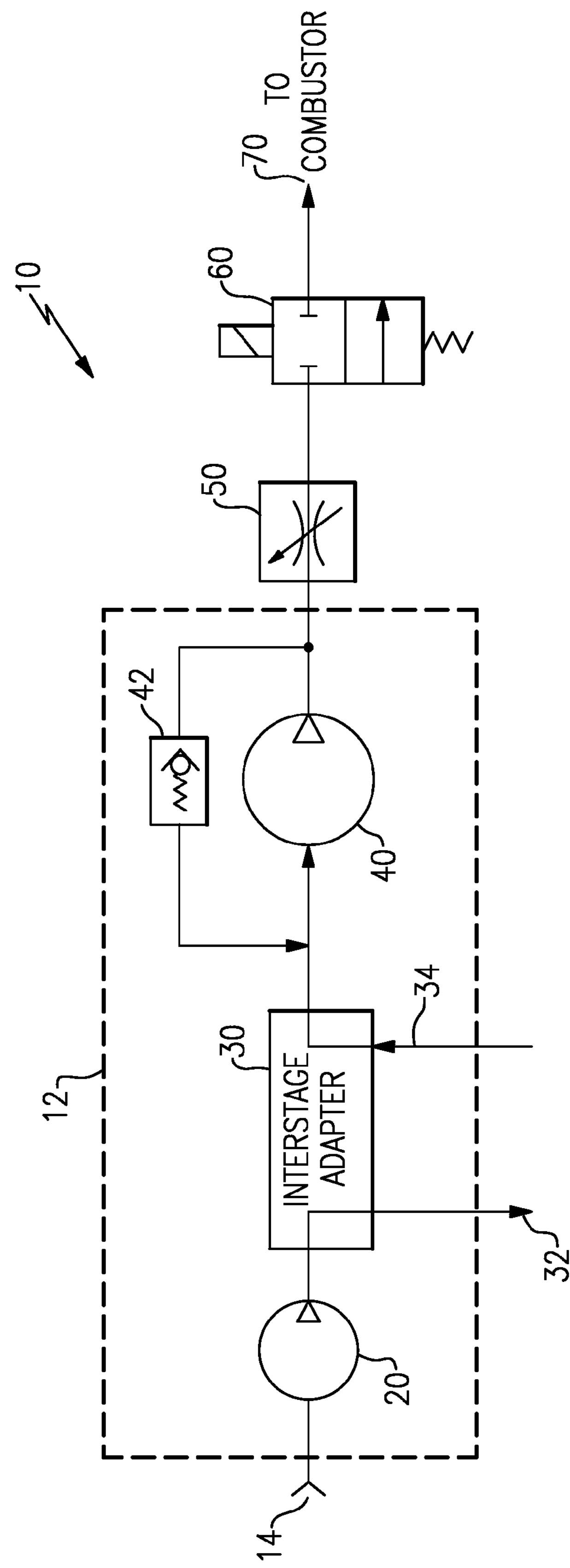
FIG. 1 illustrates a schematic flow diagram of a fuel control system.

FIG. 1 illustrates an exemplary fuel control system 10 including a two stage pump component 12. Fuel is initially pumped from a fuel supply 14, such as a fuel tank, into the fuel control system 10 using a first stage fuel pump 20. The fuel is pumped to an adapter 30, having an outlet port 32 and an inlet port 34. The fuel exits the fuel control system 10 via the outlet port 32, and returns to the fuel control system 10 via the inlet port 34. Fuel returned via the inlet port 34 is passed to a second stage fuel pump 40 that pressurizes the fuel to a pressure necessary for combustor operation. A pump relief valve 42 provides a bypass for the second stage pump 40. The pressurized fuel from the second stage pump 40 is sent to a fuel metering valve 50 that, along with a solenoid 60, controls the release of fuel to a combustor 70.

The fuel adapter 30 replaces a conventional fuel filter bowl/fuel filter and is positioned in a fuel filter bowl housing in the two stage pump component 12. The outlet port 32 of the adapter 30 allows fuel to be directed from the adapter 30 to an external fuel system 100 (illustrated in FIG. 2) and the inlet port 34 of the adapter 30 allows fuel to be returned to the fuel control system 10 from the external fuel system 100. The adapter 30 allows an existing fuel control system 10 to be retrofit to include additional elements between the first and second pump stages without requiring modification to the housing of the two stage pump component 12.

Figure 2:
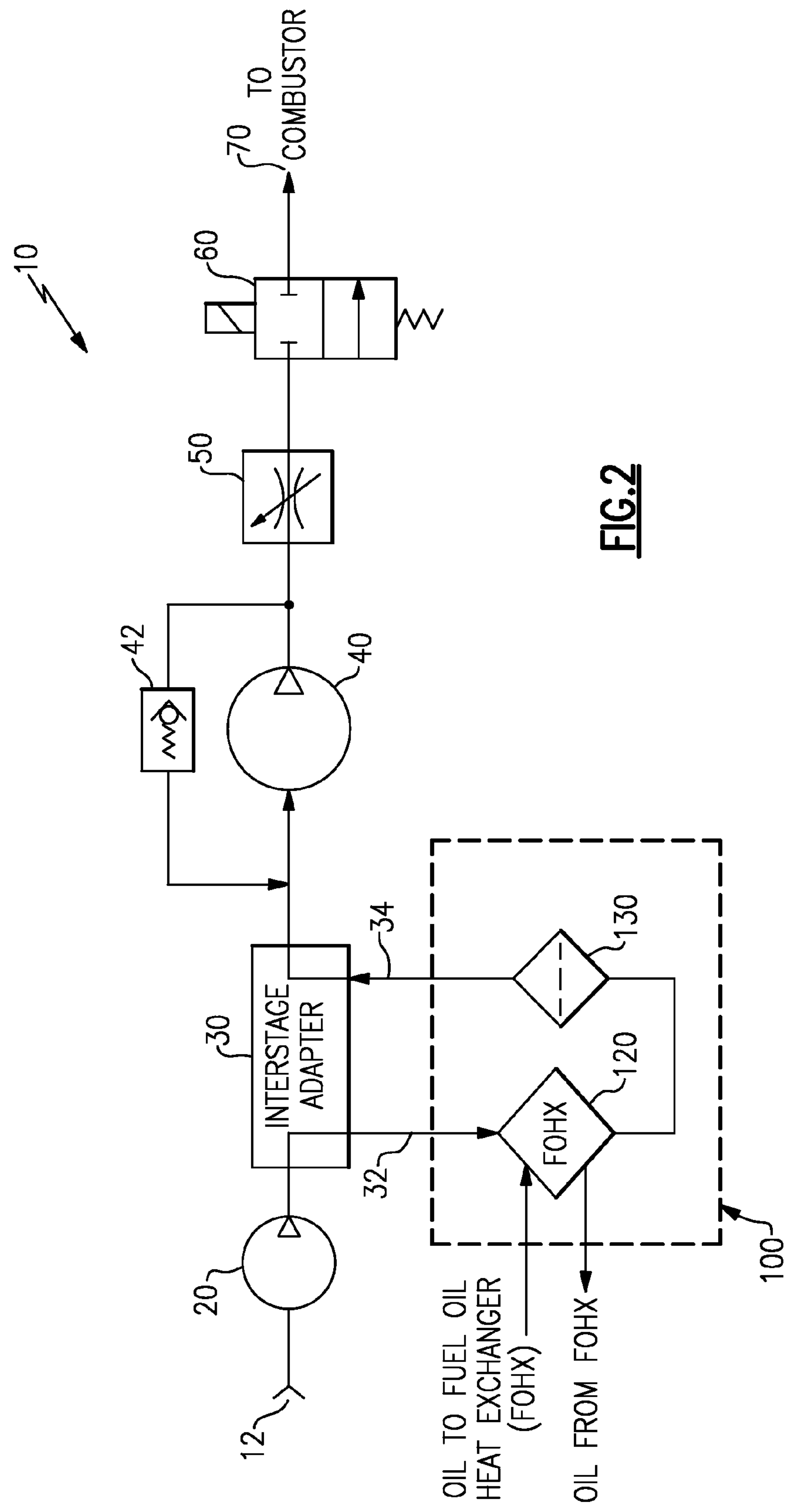
FIG. 2 illustrates the schematic flow diagram of the fuel control system of FIG. 1 with an additional external fuel system connected to an adapter.

FIG. 2 illustrates the fuel control system 10 of FIG. 1, having an external fuel system 100 connected to the adapter 30, with like numerals indicating like elements. The external fuel system 100 is connected to the adapter 30 via outlet port 32 and inlet port 34. The illustrated external fuel system 100 is a fuel oil heat exchanger 120 and a fuel filter 130, however, it is understood that any external fuel system could be included between the first pump stage 20 and the second pump stage 40 via the facilitation of the adapter 30. Fuel is sent from the outlet port 32 of the adapter 30 to the fuel oil heat exchanger 120, where it is heated to prevent icing in a fuel filter 130. The fuel is then passed through the fuel filter 130 and returned to the adapter 30 via fuel inlet port 34. In this way the fuel control system 10 is retrofit to include the fuel oil heat exchanger 120.

Figure 3:
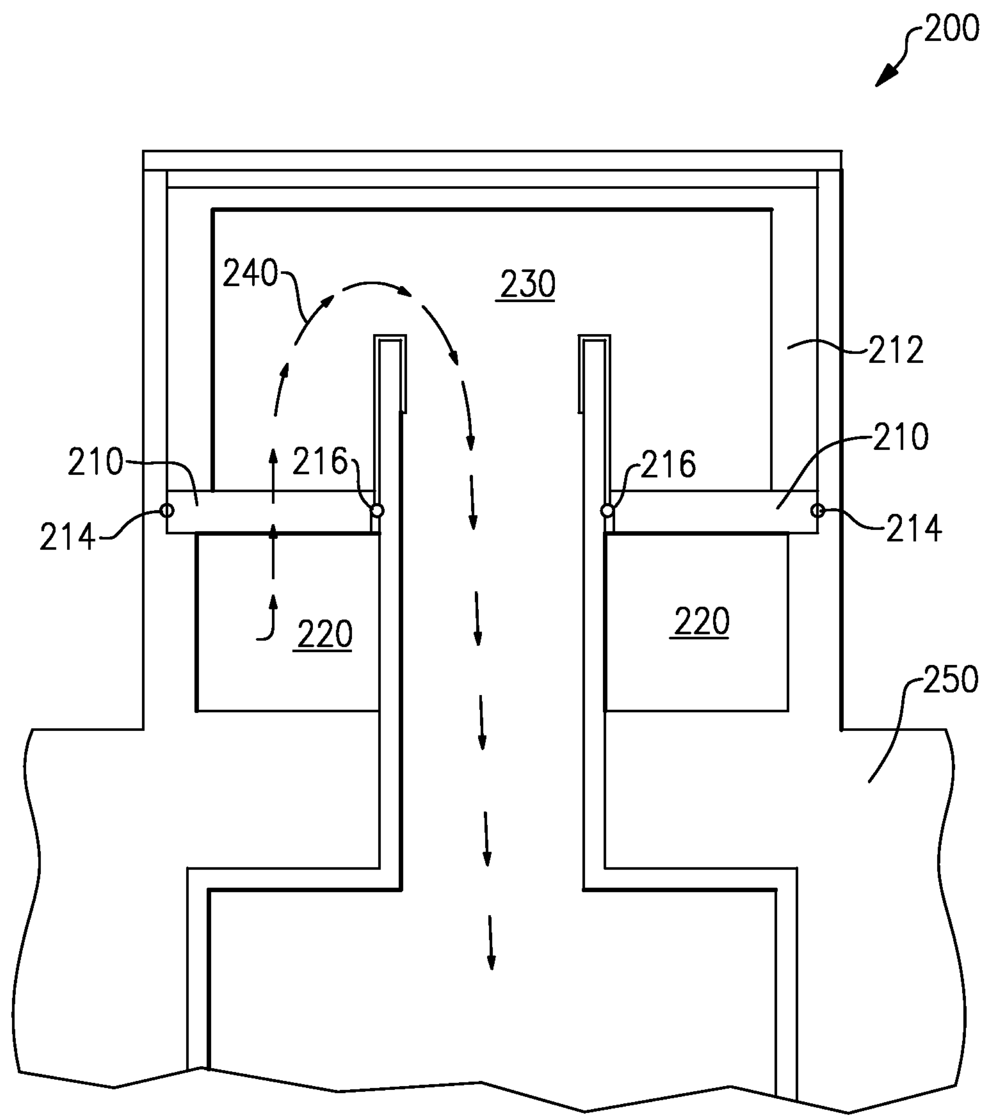
FIG. 3 illustrates a fuel pump housing and fuel filter arrangement.

FIG. 3 illustrates an example fuel filter arrangement 200 prior to installation of the adapter 30. The fuel filter arrangement 200 includes a permeable fuel filter 210 isolating a high pressure fuel zone 220 from a low pressure fuel zone 230. A fluid flow path 240 illustrates the flow of fuel through the fuel filter arrangement 200. A fuel filter bowl 212 maintains the fuel filter 210 in position and is attached to a pump housing 250 via threading, press fitting, or any other known technique. The fuel filter 210 is sealed to the pump housing via a pair of O-ring seals 214, 216.

During operation of the fuel control system 10 (illustrated in FIGS. 1 and 2) high pressure fuel is provided from the first pump stage 20 to the high pressure zone 220. The fuel passes through the permeable filter 210, which causes a pressure drop. Fuel exiting the fuel filter 210 enters the low pressure zone 230 and is fed from the low pressure zone 230 to the second pump stage 40.

Figure 4:
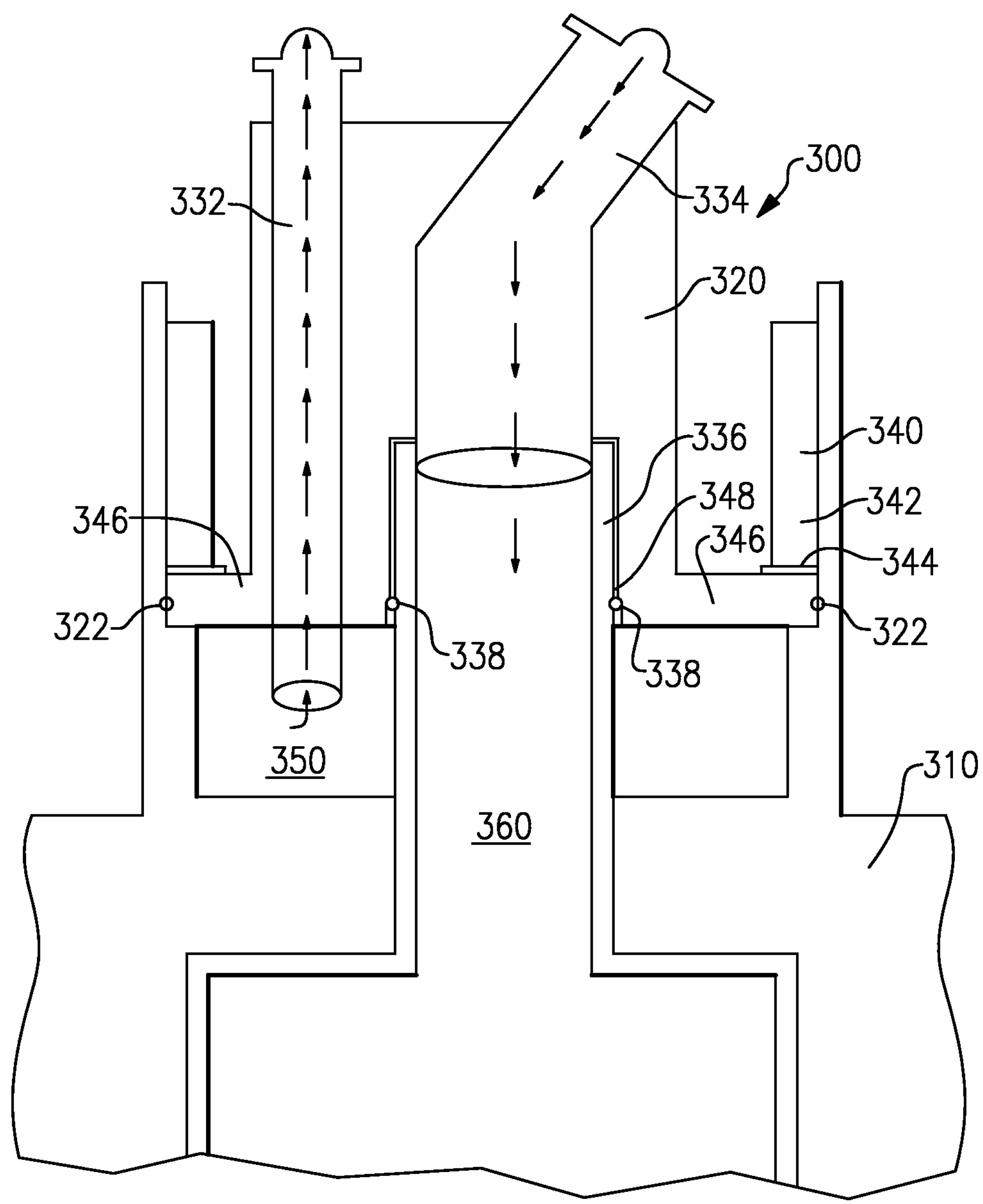
FIG. 4 illustrates a cut-away view of an example fuel filter adapter.

FIG. 4 illustrates an adapter 300 for use in place of the fuel filter 210 and the fuel filter bowl 212 in a two stage pump. The adapter 300 includes an outlet port 332 and an inlet port 334. Each of the outlet port 332 and the inlet port 334 are connected to the fuel control system 10 (illustrated in FIGS. 1 and 2) such that fuel from the high pressure zone 350 exits the two stage pump via the outlet port 332 and returns to the low pressure zone 360 via the inlet port 334. The inlet port 334 and the outlet port 332 are housed in an adapter body 320 that is sealed to the fuel pump housing 310 via an O-ring 322. The outlet port 332 connection and the inlet port 334 connection are further isolated from each other via an inlet port protrusion 336 and sealed apart via a protrusion o-ring 338.

A barrier portion 346 of the adapter body 320 provides a non-permeable barrier in place of the fuel filter 210 (illustrated in FIG. 3). The barrier portion 346 is a cylindrical portion of the adapter body 320 and includes an opening 348 for allowing a protrusion 336 to extend through the barrier portion 346. The opening 348 is a cylindrical hole. The axis defined by the barrier portion 346 and the axis designed by the opening 348 are collinear, thereby allowing the adapter 300 to be rotated about the inlet port 334, which extends into the protrusion 336. The barrier portion 346, combined with the O-ring seals 322, 338 effectively isolate the high pressure zone 350 from the low pressure zone 360.

The adapter 300 is maintained in the fuel filter housing via a fastener 340 that is tightened against the adapter 300 once the adapter 300 is properly positioned. In the illustrated example, the fastener 340 is a retainer ring 342 and a washer 344. The retainer ring 342 can be threaded, press fit into place, or affixed to the two stage pump housing 310. Use of a fastener 340 to hold the adapter 300 in place allows the adapter 300 to be rotatable about the inlet port 334 during installation, thus ensuring that the inlet port 334 and the outlet port 332 can be aligned with the external fuel system 100 properly. Alternately, the adapter 300 itself can be threaded, obviating the need for a fastener 340, but preventing free rotation of the adapter 300 during installation.

Although an example embodiment has been disclosed, a worker of ordinary skill in this art would recognize that certain modifications would come within the scope of this disclosure. For that reason, the following claims should be studied to determine the true scope and content of this disclosure.

What is claimed is:

1. A fuel system comprising:

a fuel control system having:

a first pump stage;

a second pump stage downstream of said first pump stage;

a fuel filter housing configured to retain a first component type via at least one retention feature, the fuel filter housing is connected to an output of said first pump stage via a fuel filter housing inlet and to an input of said second pump stage via a fuel filter housing outlet, wherein said first component type is a fuel filter bowl and a fuel filter;

a second component type retained in said fuel filter housing via said retention feature, wherein the second component type comprises an outlet port for connecting said fuel filter housing inlet to an input of an external fuel system, said external fuel system being external to said fuel control system, and an inlet port for connecting an output of said second fuel system, external to said fuel control system, to said fuel filter housing outlet;

wherein said second component type is a distinct component type from said first component type;

wherein said second component type is an adapter rotatable about said inlet port; and said external fuel system being connected to said second component type.

2. The fuel system of claim 1, wherein said external fuel system comprises a fuel oil heat exchanger and a fuel filter.

3. The fuel system of claim 1, wherein said adapter further comprises a non-permeable barrier isolating a high pressure zone from a low pressure zone.

4. The fuel system of claim 3, wherein said output of said first pump stage is said high pressure zone.

5. The fuel system of claim 3, wherein said input of said second stage is said low pressure zone.

6. The fuel system of claim 1, wherein said retention feature is a fastener.

7. The fuel system of claim 6, wherein said fastener is a retainer ring.

8. The fuel system of claim 7, wherein said retainer ring is threaded.

9. The fuel system of claim 7, wherein said retainer ring is press fit.

10. The fuel system of claim 1, wherein said adapter is rotatable about said inlet port within said fuel filter housing.

11. An adapter for a fuel control system comprising:

an adapter body having a non-permeable barrier for isolating a high pressure zone from a low pressure zone and a retaining portion;

an inlet port retained in said retaining portion and capable of being fluidly connected to a fuel filter housing outlet;

an outlet port retained in said retaining portion and capable of being fluidly connected to a fuel filter housing inlet;

wherein said adapter body is configured to be retained in a fuel filter housing body by a retention feature for retaining a second component type distinct from said adapter; and wherein said adapter body is rotatable about said inlet port.

12. The adapter of claim 11, wherein said adapter is rotatable about said inlet port.

13. The adapter of claim 11, further comprising a threaded retainer ring for maintaining said adapter in a fuel filter housing.

14. The adapter of claim 11, wherein said adapter is sized to fit a standard fuel filter housing.

15. The adapter of claim 11, wherein said barrier comprises a cylindrical portion of said adapter body.

16. The adapter of claim 15, wherein said barrier further comprises a cylindrical opening for allowing said inlet port to connect to said low pressure zone.

17. The adapter of claim 16, wherein said cylindrical opening defines an opening axis, said barrier defines a barrier axis, and said opening axis and said barrier axis are collinear.

18. The adapter of claim 16, wherein said barrier further comprises a seal, positioned around said opening for preventing fluid flow between said high pressure zone and said low pressure zone.

19. A method for retrofitting a fuel control system comprising:

removing a fuel filter from a fuel filter housing in a fuel control system; and installing an adapter in said fuel filter housing, thereby providing an outlet port from said fuel control system for connecting to an external fuel system and an inlet port for connecting said external fuel system to said fuel control system, wherein the adapter is a distinct component type from the fuel filter, and is rotatable about the inlet port.

20. The method of claim 19, wherein said adapter interrupts a fluid path of said fuel control system.

21. The method of claim 19, further comprising the step of connecting said outlet port of said adapter to an input of said external fuel system and connecting said inlet port of said adapter to an output of said external fuel system.

22. The method of claim 19, wherein said external fuel system comprises a fuel oil heat exchanger and a fuel filter.

23. The fuel control system of claim 1, wherein the adapter is characterized by a lack of a filter element.

24. The adapter of claim 11, wherein the adapter is further characterized by a lack of a filter element.

25. The method of claim 19, wherein the adapter is characterized by a lack of a filter element.

* * * * *